United States Patent [19]

Cuneo

[11] 4,292,571
[45] Sep. 29, 1981

[54] CONTROL DEVICE FOR CONTROLLING THE ROTATIONAL SPEED OF A PORTABLE POWER TOOL

[75] Inventor: Giuseppe Cuneo, Calolziocorte, Italy

[73] Assignee: Black & Decker Inc., Newark, Del.

[21] Appl. No.: 121,538

[22] Filed: Feb. 14, 1980

[51] Int. Cl.³ .............................................. H02P 5/16
[52] U.S. Cl. ...................................... 318/17; 318/305; 318/349; 318/514; 310/50; 408/9; 408/124; 279/62
[58] Field of Search ............... 318/514, 305, 348, 349, 318/17; 408/9, 124; 173/163; 310/68 A, 50; 279/1 H, 110

[56] References Cited

U.S. PATENT DOCUMENTS

| 3,085,169 | 4/1963 | Abel | 310/68 |
| 3,143,900 | 8/1964 | Oeckl et al. | 408/8 |
| 3,447,057 | 5/1969 | Brown et al. | 318/345 |
| 3,612,969 | 10/1971 | Cockroff | 318/305 |
| 3,936,060 | 2/1976 | Hirao | 318/603 |

Primary Examiner—David Smith, Jr.
Attorney, Agent, or Firm—Walter Ottesen; Leonard Bloom; Edward D. Murphy

[57] ABSTRACT

A speed control device for portable power tools having particular applicability to electric drills. The speed control device is adapted to automatically adjust the speed of the motor in accordance with changes in the diameter of the tool bit used. The device includes a sensor that senses the opening and closing of the jaws of the chuck. The sensor is mechanically coupled to a potentiometer circuit whose output signal is varied in accordance with movement of the sensor. The output signal of the potentiometer circuit controls the firing angle of a thyristor 34, which in turn controls the current supplied to the motor. In addition, the preferred embodiment includes a speed select switch which is connected to the potentiometer circuit to set the appropriate speed range for the motor, given the particular type of work material.

16 Claims, 5 Drawing Figures

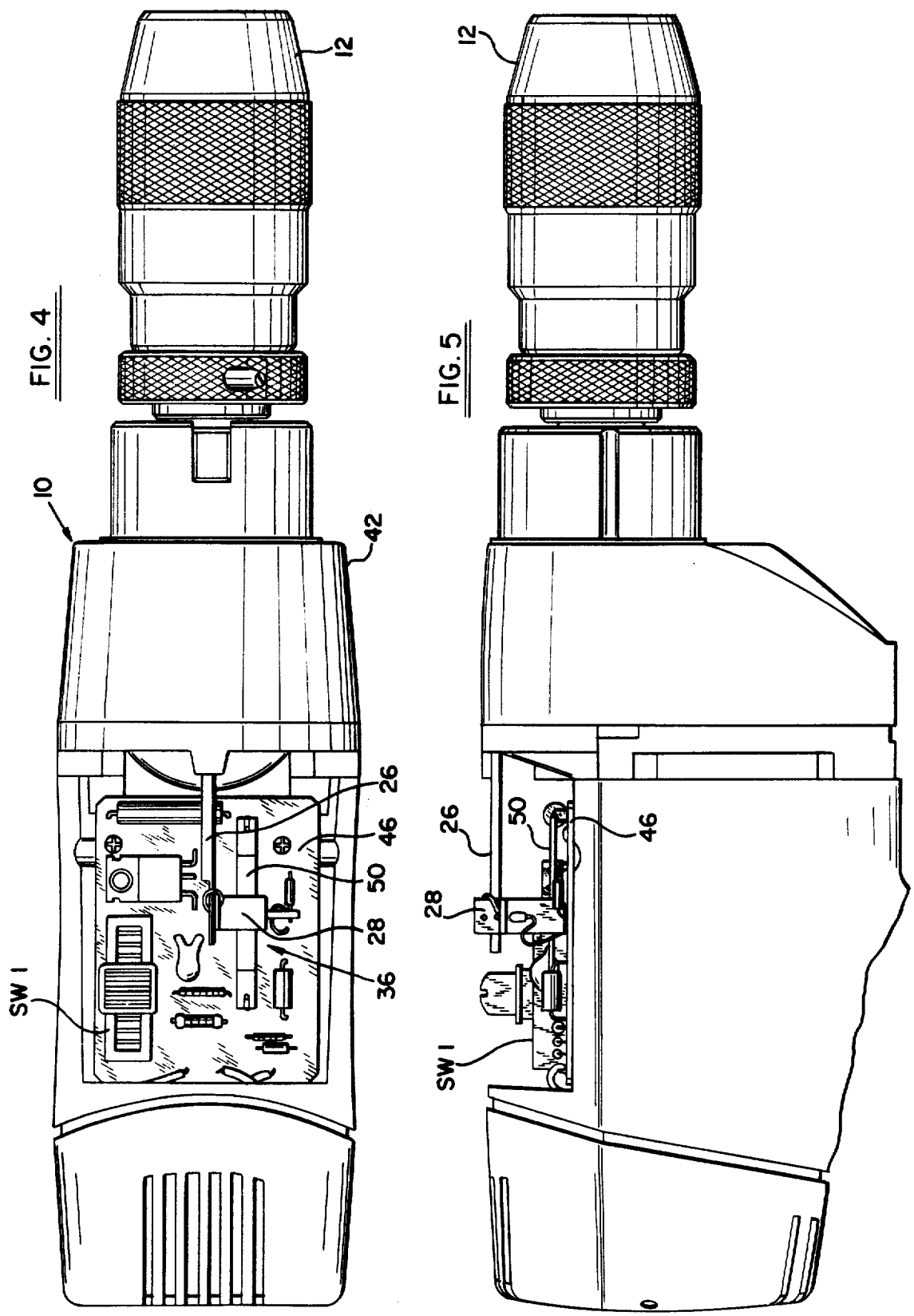

4,292,571

CONTROL DEVICE FOR CONTROLLING THE ROTATIONAL SPEED OF A PORTABLE POWER TOOL

FIELD OF THE INVENTION

The present invention relates to portable power tools and in particular to a control device for automatically controlling the speed of rotation of the electric motor of a portable power tool as a function of the degree to which the chuck of the tool is opened to accommodate the tool bit.

BACKGROUND OF THE INVENTION

It is well known in the art that the cutting speed of the tool bit of a portable power tool, as for example the drill bit of an electric drill, is a function of both the rotational speed of the motor and the diameter of the tool bit. In particular, it will readily be appreciated that for a fixed motor speed, the cutting speed of a drill bit will increase proportionately with increases in the diameter of the drill bit used. Accordingly, prior art electric drills are known to include motor speed control knobs which can be manually adjusted by an operator to set the speed of the motor to the recommended speed for a given bit diameter as provided on a reference table. With prior art electric drills, therefore, it is incumbent upon the operator to remember to adjust the speed of the motor each time the size of the drill bit is changed. Failure to correctly set the speed of the motor can cause less than optimum operation and a consequent premature wearing of the tool bit.

Accordingly, it is the primary object of the present invention to provide a control device for a portable power tool, such as an electric drill, that will automatically adjust the speed of the motor in accordance with changes in the diameter of the tool bit used.

In addition, it is a further object of the present invention to provide a control device for a portable power tool, such as an electric drill, which also includes means for permitting an operator to initially preset the speed of the motor to an optimum reference speed for a particular type of material so that subsequent motor speed changes caused by changes in bit size are made relative to the preset reference speed.

BRIEF DESCRIPTION OF THE DRAWINGS

FIG. 4 is a plan view of a portable electric drill equipped with the speed control device according to the invention.

FIG. 5 is an elevation view of the portable electric drill of FIG. 4.

DETAILED DESCRIPTION OF THE PREFERRED EMBODIMENT

Figure 1:
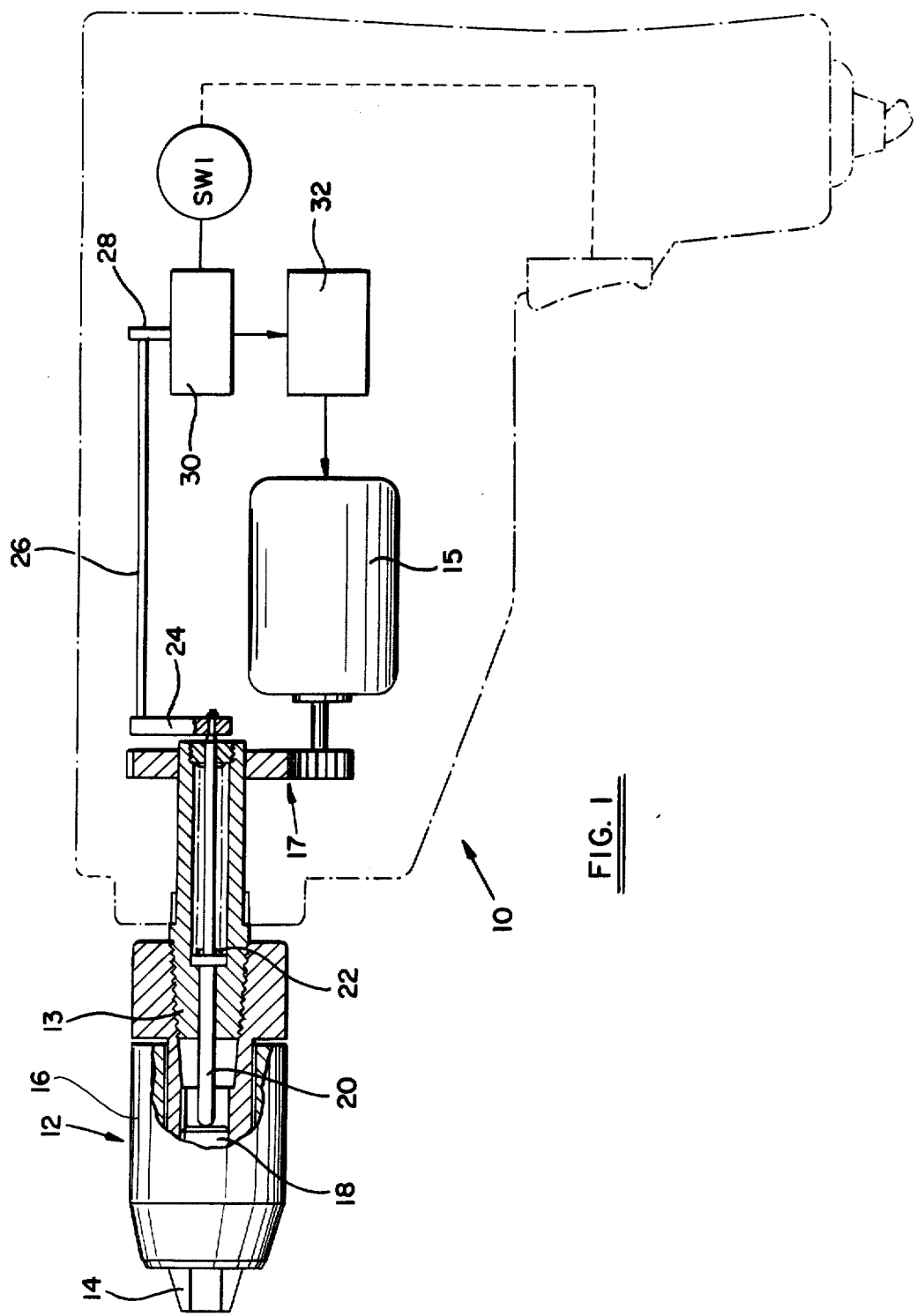
FIG. 1 is a diagrammatical elevational view partially in section of an electric drill incorporating the speed control device of the present invention.

Referring to FIG. 1, an electric drill 10 incorporating the speed control device of the present invention is shown. The electric drill 10 is otherwise conventional in construction and includes a keyless chuck 12 which is rotatably driven through a gear assembly 17 by an electric motor 15. The drill chuck 12 can be of the kind known as a keyless Validus chuck and includes a plurality of jaws 14 which are opened and closed under the control of a ring 16 for securing a drill bit in the chuck. Ring 16 acts upon jaws 14 via a thrust plate 18 which moves fore and aft with adjustments in ring 16 to open and close jaws 14 as is conventional. The position of the thrust plate 18 is therefore indicative of the size of the opening defined by the jaws 14.

In accordance with the present invention, the shaft 13 of chuck 12 has an axial bore formed therein to accommodate a sensor rod 20 whose forward end is maintained in constant contact with thrust plate 18 under the bias of a spring 22. Sensor rod 20 is mechanically coupled via element 24 to a connecting rod 26 which is in turn connected to the wiper arm 28 of a potentiometer circuit 30. The output of the potentiometer circuit 30 is provided to a speed control circuit 32 which controls the amount of current supplied to the motor 15 in accordance with the setting of the potentiometer circuit 30. Thus, it can be seen that as the chuck jaws 14 are opened and closed to accommodate various sized drill bits, the position of the wiper arm 28 of potentiometer circuit 30 is adjusted via the mechanical connection through sensor rod 20, element 24 and connecting rod 26, thereby varying accordingly the speed of the motor 15.

In addition, the preferred embodiment of the present invention includes a multiple-position speed select switch SW1 for manually selecting an optimum speed range for a given type of material.

Figure 2:
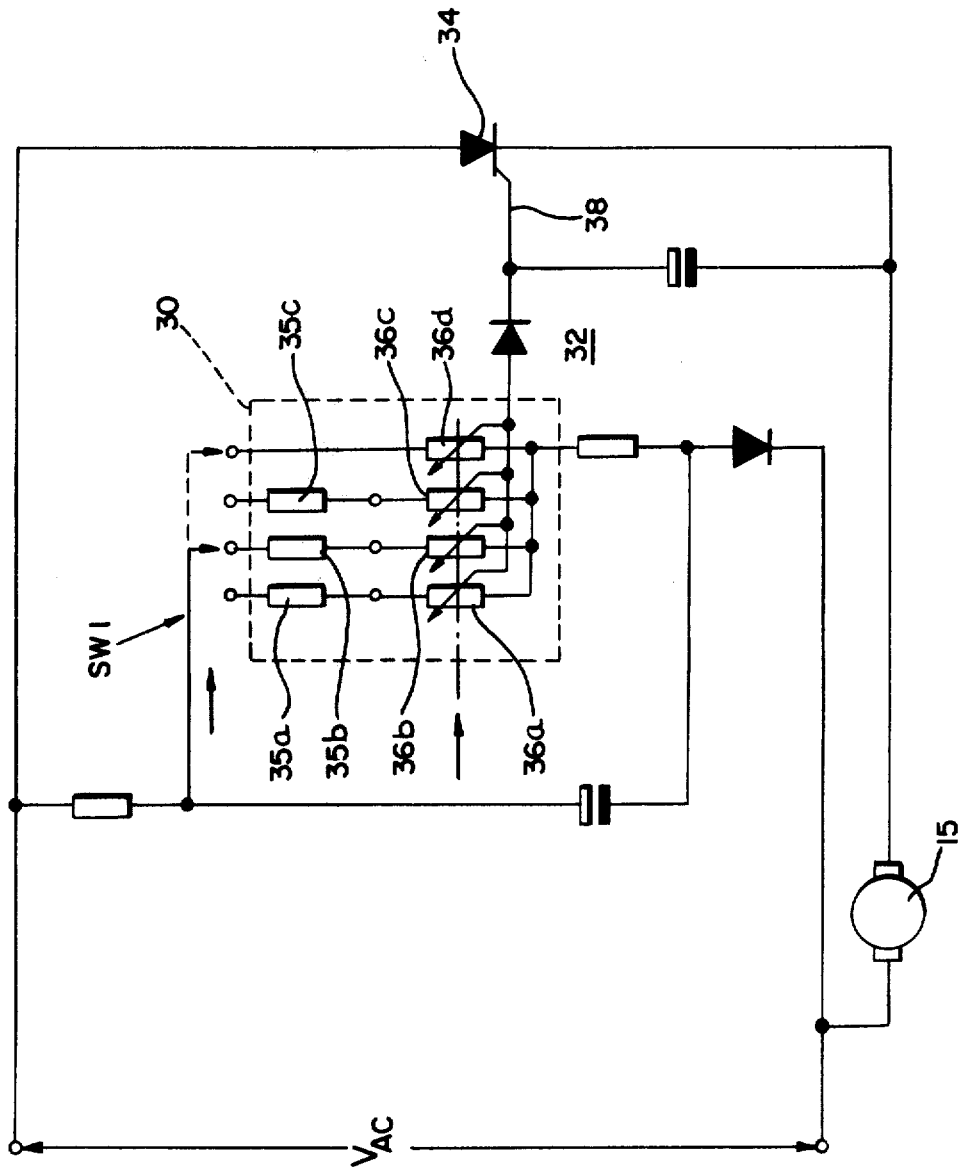
FIG. 2 is a circuit diagram of the speed control device of the present invention.

Turning now to FIG. 2, a circuit diagram of the speed control circuit of the present invention is shown. The speed of the motor 15 is controlled by controlling the amount of current supplied to the motor. This is accomplished in a conventional manner by controlling the firing angle of a semiconductor switching device, herein a thyristor 34, which is connected in series with the motor 15. The firing angle of thyristor 34 is controlled by varying the magnitude of the voltage provided on line 38 to the gate of thyristor 34, which is in turn determined by the setting of the potentiometer circuit 30. In the preferred embodiment, the potentiometer circuit 30 comprises four parallel connected variable resistors 36a–36d which have their wiper arms mechanically tied together and their wiper terminals tied in common to line 38. One side of each of the variable resistors 36a–36d is tied in common to one side of the voltage source and the other side of each of the variable resistors 36a–36d is connected through another resistor, 35a–35c respectively, to one of the select terminals of the speed select switch SW1, except for variable resistor 36d which is connected directly to switch SW1 as shown. The movable contact terminal of select switch SW1 is connected to the other side of the voltage source. Thus, it can be seen that the setting of select switch SW1 determines which series connected resistor pair—i.e., resistor 35a and potentiometer 36a, resistor 35b and potentiometer 36b, resistor 35c and potentiometer 36c, or potentiometer 36d—will be switched in circuit to control the voltage signal on line 38. Since the values of resistors 35a–35c are unequal, it will be appreciated that the voltage range of the signal on line 38 can be altered by changing the setting of select switch SW1. In other words, the range over which the speed of the motor will vary pursuant to changes in the position of the chuck jaws is determined by the setting of speed select switch SW1.

Accordingly, in practice an operator will initially set the position of select switch SW1 in accordance with the type of work material. This serves to establish the appropriate optimum speed range for that particular material, given the range of bit sizes which can be acommodated by the drill. Thereafter, as the position of the chuck jaws is changed to accommodate various sized drill bits, the resistance values of the potentiometers 36a—36d will change accordingly as previously described, to thereby automatically adjust the speed of the motor 15 relative to the speed range selected. In the embodiment illustrated, four different speed ranges are provided. However, additional speed selections for accommodating a wider variety of materials can readily be added to the control circuit if desired.

Figure 3:
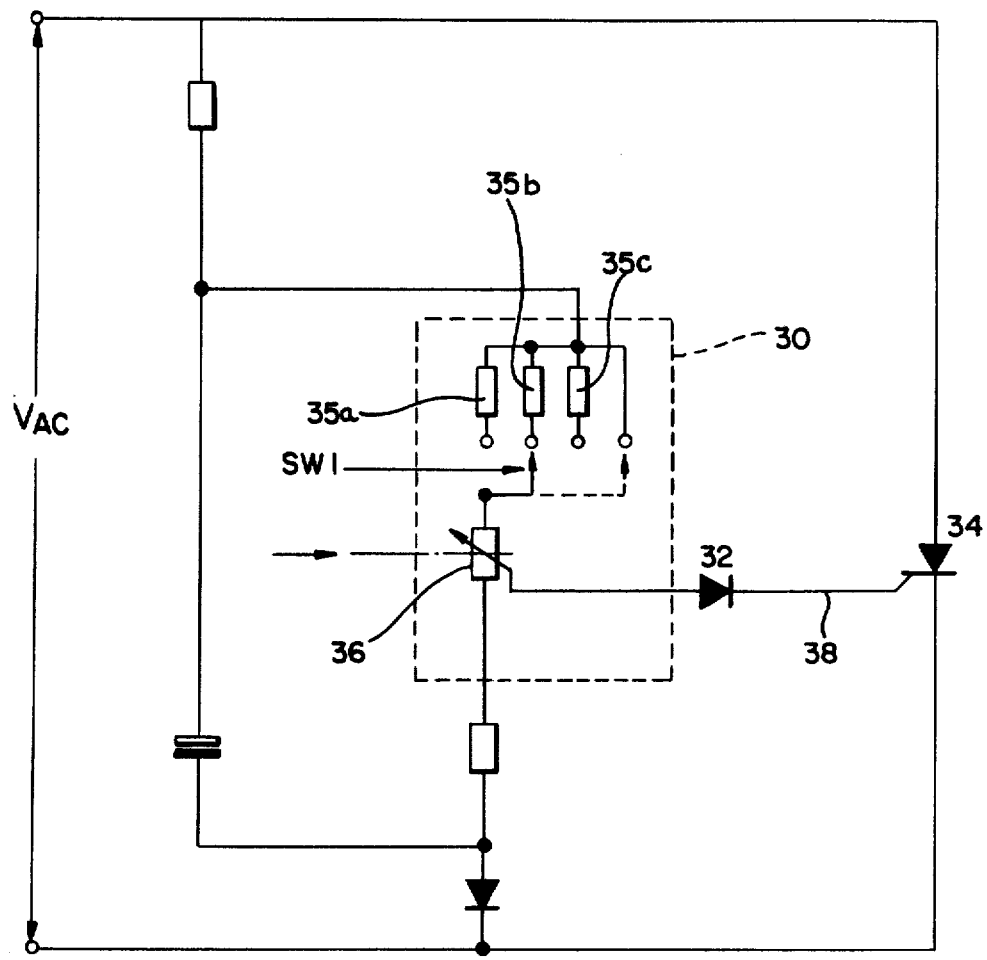
FIG. 3 is a circuit diagram of the speed control device of the present invention incorporating alternative potentiometer circuit.

According to another embodiment of the invention, the potentiometer circuit can be configured as shown in FIG. 3 wherein only one potentiometer 36 is required. Thus, when the position of the chuck jaws are changed, the resistance value of potentiometer 36 will change accordingly.

Referring now to FIG. 4, a portable electric drill 10 is equipped with a housing 42 and a keyless chuck 12. The top portion of the housing is cut away to show the speed-control circuit 32 mounted on a printed-circuit board 46. The printed-circuit board 46 is mounted in the upper part of the housing 42 as shown in close proximity of the connecting rod 26 slideably mounted in the housing. The connecting rod 26 is connected to the sensor rod 20 as shown in FIG. 1.

The potentiometer 36 is mounted on the board 46 and includes resistance element 50 and a wiper arm 28 attached to the connecting rod 26. By adjusting the chuck 12 to accommodate a drill bit of a size selected by the operator, the rod 26 is moved in a direction along its longitudinal axis as previously described so that the voltage taken off of the wiper arm is indicative of the drill size.

The switch SW1 of FIGS. 2 and 3 is also mounted on board 46 as are other components of the speed-control circuit.

While the above description constitutes the preferred embodiment of the present invention, it will be appreciated that the invention is susceptible to modification, variation and change without departing from the proper scope or fair meaning of the accompanying claims.

What is claimed is:

1. In a portable electric tool having an electric motor for driving an adjustable tool holder capable of receiving and accommodating various diameter tools, the improvement comprising:
    sensor means operatively connected to said tool holder for sensing the diameter of the tool secured in said tool holder; and,
    speed control means operatively connected to said sensor means for controlling the speed of said motor in accordance with the sensed diameter of said tool.

2. The portable electric tool of claim 1 wherein said speed control means includes potentiometer means connected to said sensor means for producing an output signal that varies in accordance with variations in the sensed diameter of the tool secured in said tool holder.

3. The portable electric tool of claim 2 wherein said speed control means further includes a control circuit connected to said potentiometer means for controlling the current supplied to said motor in accordance with said output signal.

4. The portable electric tool of claim 3 wherein said speed control means further includes switch circuit means connected between a source of electrical power and said potentiometer means for controlling the magnitude of the voltage signal supplied to said potentiometer means.

5. The portable electric tool of claim 4 wherein said switch means includes a manually operable multiple-position select switch.

6. In a portable electric tool having an electric motor for driving an adjustable tool holder capable of receiving and accommodating various size tools, the improvement comprising:
    sensor means operatively connected to said tool holder for sensing the size of the tool secured in said tool holder;
    speed control means operatively connected to said sensor means for controlling the speed of said motor in accordance with the sensed size of said tool; and
    wherein said tool holder comprises a chuck rotatably mounted to a shaft drivingly coupled to said motor, and said sensor means includes a sensor rod slidably disposed within a bore formed in said shaft.

7. The portable electric tool of claim 6 wherein said chuck includes a plurality of jaws and an actuating member that is adapted to open and close said jaws for securing in said chuck various size tools, and said sensor means further includes a biasing member for maintaining said sensor rod in operative contact with said actuating member.

8. In a portable electric tool having an electric motor for driving an adjustable tool holder capable of receiving and accommodating various diameter tools, the improvement comprising:
    sensor means operatively connected to said tool holder for sensing the diameter of the tool secured in said tool holder;
    potentiometer means connected to said sensor means for producing an output signal whose magnitude varies in accordance with the sensed diameter of the tool secured in said tool holder;
    control circuit means connected to said potentiometer means for varying the supply of current to said motor in accordance with the magnitude of said output signal; and
    switch circuit means connected between a source of electrical power and said potentiometer means for controlling the magnitude of the signal supplied to said potentiometer means.

9. A portable electric tool comprising:
    a housing;
    a motor mounted in the housing;
    a control circuit for controlling the speed of the motor;
    a tool holder adjustable for accommodating a tool therein of any diameter selected from a plurality of tools having respectively different diameters;
    the control circuit including a control member for adjusting the speed of the motor; and,
    sensor means operatively connecting the tool holder to the control member in response to the diameter of the tool inserted into the tool holder thereby automatically adjusting the speed of the motor in response to the diameter of the tool.

10. A portable electric tool comprising:

a housing;

a motor mounted in the housing;

a control circuit for controlling the speed of the motor;

a tool holder adjustable for accommodating a tool therein of any size selected from a plurality of tools having respectively different sizes;

the control circuit including a control member for adjusting the speed of the motor;

sensor means operatively connecting the tool holder to the control member in response to the size of the tool inserted into the tool holder thereby automatically adjusting the speed of the motor in response to the size of the tool;

the tool holder having a thrust plate movable for and aft to a position dependent upon the size of the tool inserted into the tool holder;

the sensor means including a rod-like structure slideably mounted in the housing and, resilient means resiliently biasing one end of said rod-like structure against the thrust plate; and, said control member being a potentiometer connected into said control circuit and having a wiper arm connected to the other end of said rod-like structure.

11. The portable tool of claim 10, said control circuit including a printed-circuit board mounted in the housing in close proximity to said other end of said rod-like structure, said control member being mounted on said printed-circuit board adjacent said other end of said rod-like structure.

12. The portable tool of claim 9, said control circuit including switch circuit means connected to said control member for adjusting the speed of the motor to the material to be worked upon by the tool.

13. The portable tool of claim 12, said switch circuit means being connected to said control member so that respective speed adjustments obtained from said switch circuit means and said control member are superimposed one upon the other.

14. An electric tool comprising:

a housing;

a motor mounted in the housing;

a control circuit for controlling the speed of the motor;

a tool holder adjustable for accommodating a tool therein of any diameter selected from a plurality of tools having respectively different diameters;

the control circuit including a control member for adjusting the speed of the motor; and, sensor means operatively connecting the tool holder to the control member in response to the diameter of the tool inserted into the tool holder thereby automatically adjusting the speed of the motor in response to the diameter of the tool.

15. A method of controlling the speed of the motor of a portable electric tool equipped with a speed-control circuit for controlling the speed of the motor and a tool holder adjustable for accommodating a tool therein of any diameter selected from a plurality of tools having respectively different diameters, the tool holder being operatively connected to a control member of the speed-control circuit, the method comprising the step of adjusting the adjustable tool holder to accommodate the selected tool and thereby automatically setting the control member of the speed-control circuit to a position to obtain a speed of the motor corresponding to the diameter of the tool inserted in the tool holder.

16. The method of claim 15 wherein the speed-control circuit includes switch circuit means connected to said control member for adjusting the speed of the motor to the material to be worked upon by the tool, the method including the further step of setting said switch circuit means to accommodate the material to be worked upon.

* * * * *